H. REICHE.
INTERNAL COMBUSTION ENGINE.
APPLICATION FILED APR. 29, 1907.

1,142,367.

Patented June 8, 1915.
7 SHEETS—SHEET 1.

Witnesses:
John P. Davis

Inventor:
Hermann Reiche

H. REICHE.
INTERNAL COMBUSTION ENGINE.
APPLICATION FILED APR. 29, 1907.

1,142,367.

Patented June 8, 1915.
7 SHEETS—SHEET 2.

Fig. 2.

Witnesses:
John P. Davis

Inventor:
Hermann Reiche

UNITED STATES PATENT OFFICE.

HERMANN REICHE, OF BELLEMEAD, NEW JERSEY.

INTERNAL-COMBUSTION ENGINE.

1,142,367.  Specification of Letters Patent.  Patented June 8, 1915.

Application filed April 29, 1907. Serial No. 370,742.

*To all whom it may concern:*

Be it known that I, HERMANN REICHE, a citizen of the United States, and a resident of Bellemead, Somerset county, New Jersey, have invented certain new and useful Improvements in Internal-Combustion Engines, of which the following is a specification.

My invention relates to internal combustion engines, and has for its object to provide an efficient construction by which simplicity, ready adjustment of speed and reliable operation are secured.

The features of my invention are chiefly, a novel arrangement and operation of two pistons, viz: a power piston and an auxiliary piston, to insure a thorough clearing or scavenging of the cylinder and also other advantages; an arrangement by which the power piston exerts a driving action during both strokes; a novel ignition device and means for timing it; and a special mechanism for rotating a shaft by the motion of the power piston and controlling the auxiliary piston by the rotation of said shaft.

Other features of the invention will be explained in the description following hereinafter and particularly pointed out in the appended claims.

Reference is to be had to the accompanying drawings, in which—

Figures 5, 14:
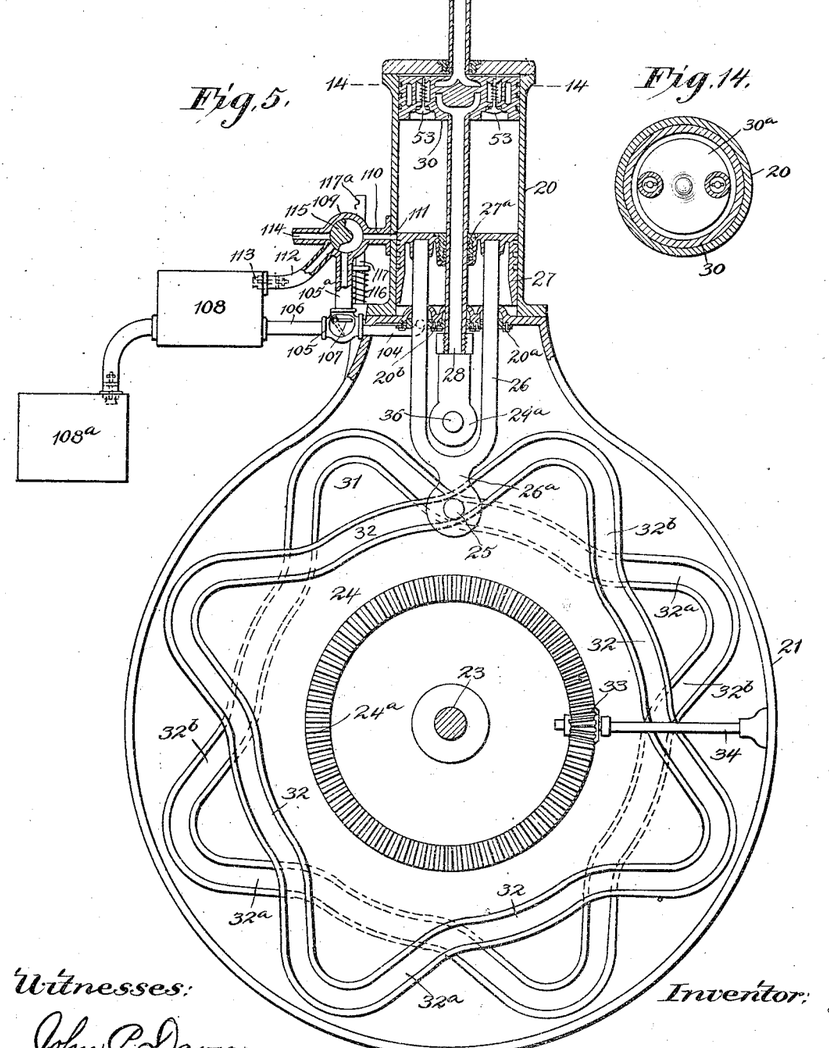
Fig. 5 is a front elevation with parts removed to show two of the central disks, the cylinder and some adjacent parts and the shaft being shown in section.
Fig. 14 is a horizontal section on line 14—14 of Fig. 5.

The engine shown in the drawing comprises a cylinder 20 located on top of a casing having a cylindrical wall 21 and end wall or heads 22 in which the shaft 23 is journaled. On this shaft is secured rigidly a central disk 24 provided with an undulating guide or groove in its opposite faces, which guide is engaged by pins or rollers 25 projected from the forked lower end 26ᵃ of a rod 26 attached to the (see Fig. 6) power piston 27 and passing through stuffing boxes 20ᵃ at the bottom of the cylinder 20. The piston rod 26 is forked at its upper end, as shown in Fig. 5, so as to leave a clearance for the passage and movement of a central piston rod 28 and a yoke 29 which are rigidly connected with the auxiliary piston 30 located in the cylinder 20 above the power piston 27. The piston 30 is preferably hollow and in communication with the hollow piston rod 28 open at both ends to the air, said rod extending from both sides of the auxiliary piston and passing through a stuffing box 20ᵇ in the cylinder head and through another stuffing box 27ᵃ in the power piston. A deflector 30ᵃ may be located in the auxiliary piston to compel a spreading of the current of air which rushes through the piston and piston rod during their reciprocation to cool them and indirectly the cylinder and power piston. The pins or rollers 25 also engage guides or grooves in two disks 31 mounted loosely on the shaft 23 at each side of the disk 24, these three disks forming a central set of disks controlled directly by the power piston 27. The grooves or guides of these disks are of the peculiar formation shown in Fig. 5, each guide having portions 32 which are arcs of a circle whose center is on the axis of the shaft 23, and converging, outwardly extending portions 32ᵃ, 32ᵇ, the outer ends of which are connected by rounded portions. The guides therefore have a somewhat star-shaped outline. The guides of the two disks 31 are always similarly located, that is, corresponding portions of them register lengthwise of the shaft, but the guide of the central disk 24 is sometimes staggered with reference to those of the disks 31, that is, the points of the guide on the central disk come between the points on the disks 31 in positions such as the one shown in Fig 5. It will be obvious that a reciprocation of the power piston 27 will cause the disk 24 to rotate in one direction, and the disks 31 in the opposite direction. A positive connection is effected between the disks, by providing them with gear teeth 24ª, 31ª respectively meshing with pinions 33 which are mounted on stationary studs 34. Each pinion engages teeth on the disk 24 and on one of the disks 31. For the sake of clearness only one such pinion has been shown in Fig. 5, but generally I will employ two in diametrically opposite positions. Such a pinion or set of pinions is provided on each face or side of the central disk 24. The piston 27 drives the rotary members or disks 24 and 31 as long as the pins or rollers 25 engage the guide portions 32ª, 32ᵇ (both strokes of the power piston being active strokes, as hereinafter described); the momentum of the engine parts is relied upon to rotate the disks 24, 31 while the pins or rollers 25 engage the guide portions 32.

Figures 7, 8, 9, 10, 11, 12:
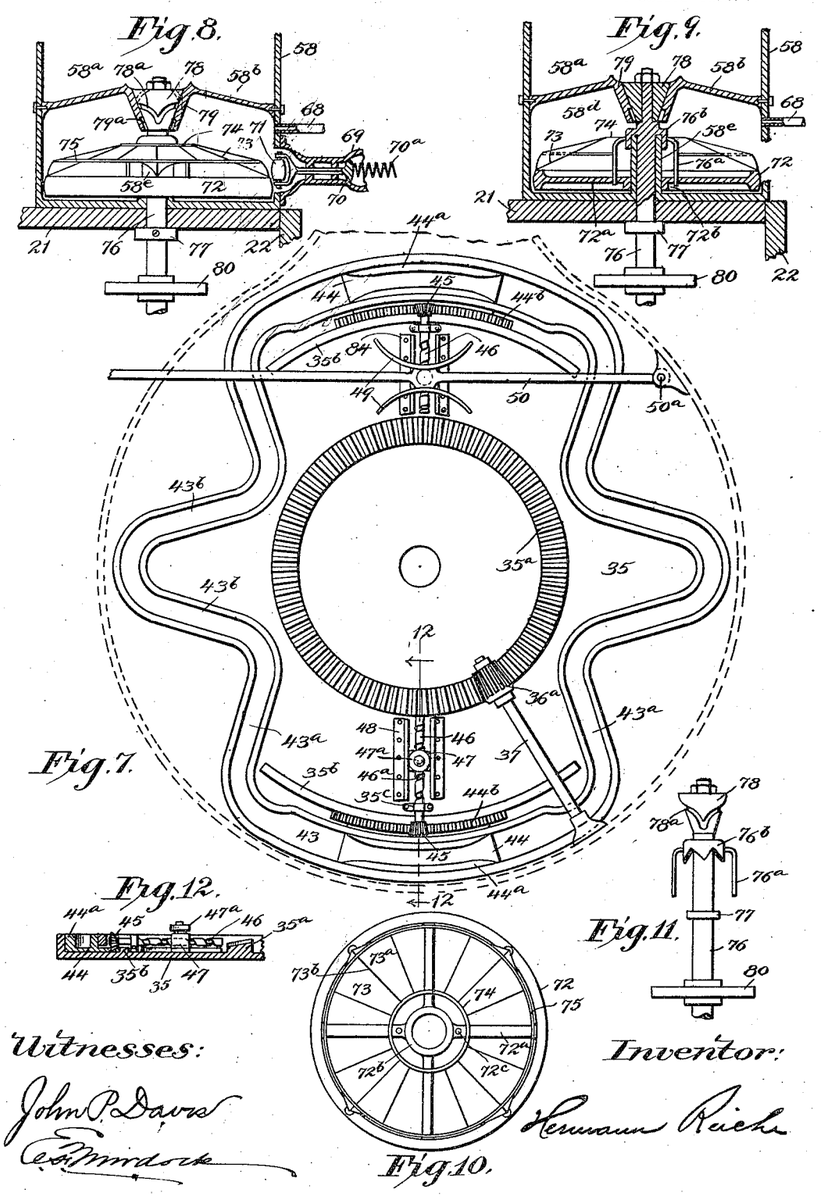
Fig. 7 is a face view showing one of the side disks and its connections.
Fig. 8 is a vertical section of the lower portion of the carbureter.
Fig. 9 is a similar view showing the carbureter fan and rotary feeder in section.
Fig. 10 is a top view of the carbureter fan.
Fig. 11 is an elevation of the rotary feeder and the parts connected therewith.
Fig. 12 is a section on line 12—12 of Fig. 7.

The yoke 29 (connected with the auxiliary piston 30) has arms 29ª depending between lateral sets of rotary members or disks 35 provided with guides of a character more fully described hereinafter, which guides are engaged by pins or rollers 36 similar to the pins or rollers 25. All the lateral disks 35 are loose upon the shaft 23, and to compel the two disks 35 of the same set to rotate in opposite directions, I provide them with gear teeth 35ª which mesh with pinions 36ª (one of which is shown in Fig. 7) mounted on stationary studs 37. These pinions correspond to the pinions 33 in function and arrangement. To the outermost disk 35 of each set is secured rigidly a gear wheel 38 in mesh with a gear wheel 39 held to rotate together with a smaller gear wheel 40, as by keying both of these wheels on the same shaft 41 journaled in the casing. Each gear wheel 40 meshes with a gear wheel 42 keyed to the shaft 23. In the particular case illustrated, the wheels 38, 39 are of equal diameters, and the wheels 42 twice as large as the wheels 40, so that the lateral disks 35 will rotate twice as fast as the central disks 24, 31. Power may be taken from the shafts 23 or 41 by means of any well-known or approved devices.

The guides of the lateral disks 35 (see Figs. 4 and 7) comprise outer portions 43 forming arcs of a circle the center of which is on the axis of the shaft 23, inwardly converging portions 43ª at the ends of each arc 43, and outwardly converging portions 43ᵇ connecting the inner ends of the portions 43ª. In the particular case shown, there are two arcs 43 and two points formed by the portions 43ᵇ, this being half the number of points of that provided for the guides of the central disks 24, 31; but since the lateral disks rotate twice as fast as the central disks, the result is the same as if the lateral disks rotated at the same speed and were provided with the same number of points as the central disks. It will therefore be seen that during one complete revolution of the shaft 23 (two revolutions of the disks 35) the power piston 27 will have eight strokes (four inward and four outward) and four periods of rest while the auxiliary piston 30 will have sixteen main strokes (eight inward and eight outward), and four periods of comparative rest. The exact succession of these strokes will be described hereinafter.

The ignition is effected by a sudden increase of pressure after the mixture or charge has been compressed. The particular manner in which I bring about this increase of pressure, in the specific case represented in the drawings, consists in giving the auxiliary piston a sudden short stroke (ignition stroke) toward the power piston. This occurs during what I have termed the period of comparative rest, while the pins or rollers 36 travel in one of the arcs 43. For this purpose, the disks 35 are provided at the arcs 43, with slides 44, having inward projections 44ª, which obviously will give the pins 36, and therefore the auxiliary piston 30, a short inward movement.

Figures 1, 13:
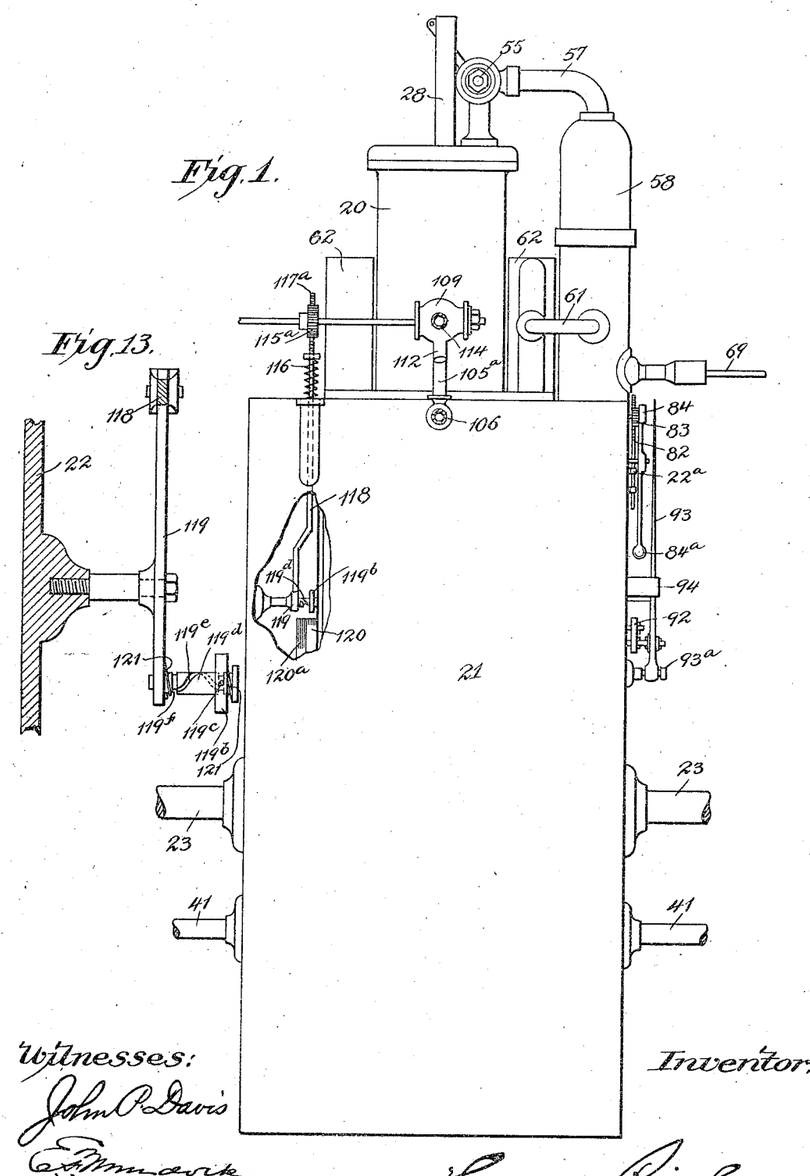
Figure 1 is a side elevation of an engine embodying my invention.
Fig. 13 is a detail of a self-adjusting valve-operating roller.
Figure 2:
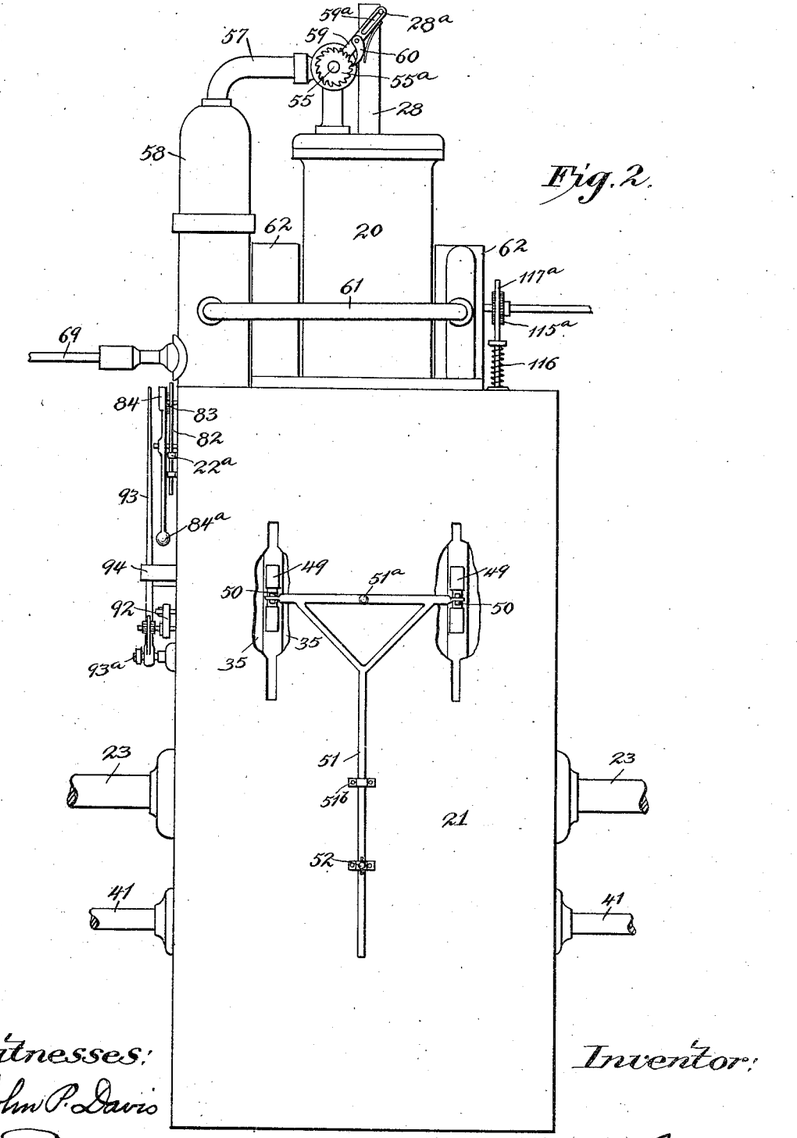
Fig. 2 is an elevation from the opposite side.

In order that the timing of the ignition may be varied, the slides 44 are adjustable circumferentially along guides 35ᵇ and are provided with segmental racks 44ᵇ engaged by pinions 45. Each pinion is rigidly secured to a radial shaft 46 journaled in a bearing 35ᶜ on the disk 35, and also journaled in a slide 7 movable on radial slideways 48 secured to the disk. The shaft 46 has a spiral groove 46ª and the slide 47 a helical feather. The slide 47 further carries an outwardly projecting pin 47ª which (as the disk 35 rotates) is adapted to pass between the oppositely convexed arms 49 secured to an actuating lever 50 fulcrumed on the casing at 50ª. There are two such levers, as shown in Fig. 2, provided with forked ends 50ᵇ (Fig. 4) into which project pins at the ends of an adjusting frame 51 provided with a handle 51ª and adjustable vertically in guides 51ᵇ on the casing, and locked by a set screw 52 or otherwise. As long as the levers 50 are in the same position, the slides 44 will remain in the same position. If however the levers 50 are raised or lowered, the arms 49 will strike the pins 47ᵇ and move the slides 47 in or out, causing a proportional rotation of the radial shafts 46 and circumferential shifting of the slides 44 in one direction or the other, and consequently an advancing or retarding of the ignition stroke.

The auxiliary piston is provided with passages leading through it and controlled by inwardly-opening valves 53 which open automatically during the outward (upward) stroke of said piston to let a charge either of air or of combustible mixture pass from above to below the auxiliary piston. This charge enters through an inlet 54 at the top of the cylinder 20 which inlet, according to the position of a rotary valve or cock 55 connects either with an air inlet controlled by an inwardly-opening check valve 56, or with the connection 57 leading to the top of the carbureter 58. The valve 55 is given a partial turn at each downward stroke of the auxiliary piston 30, the upper end of the piston rod 28 being for this purpose provided with a pin 28$^a$ projecting into a slot 59$^a$ of an arm 59. This arm is mounted to rock loosely on the end of the valve plug 55 and has a pawl 60 in engagement with a ratchet 55$^a$ formed on said plug.

Figure 4:
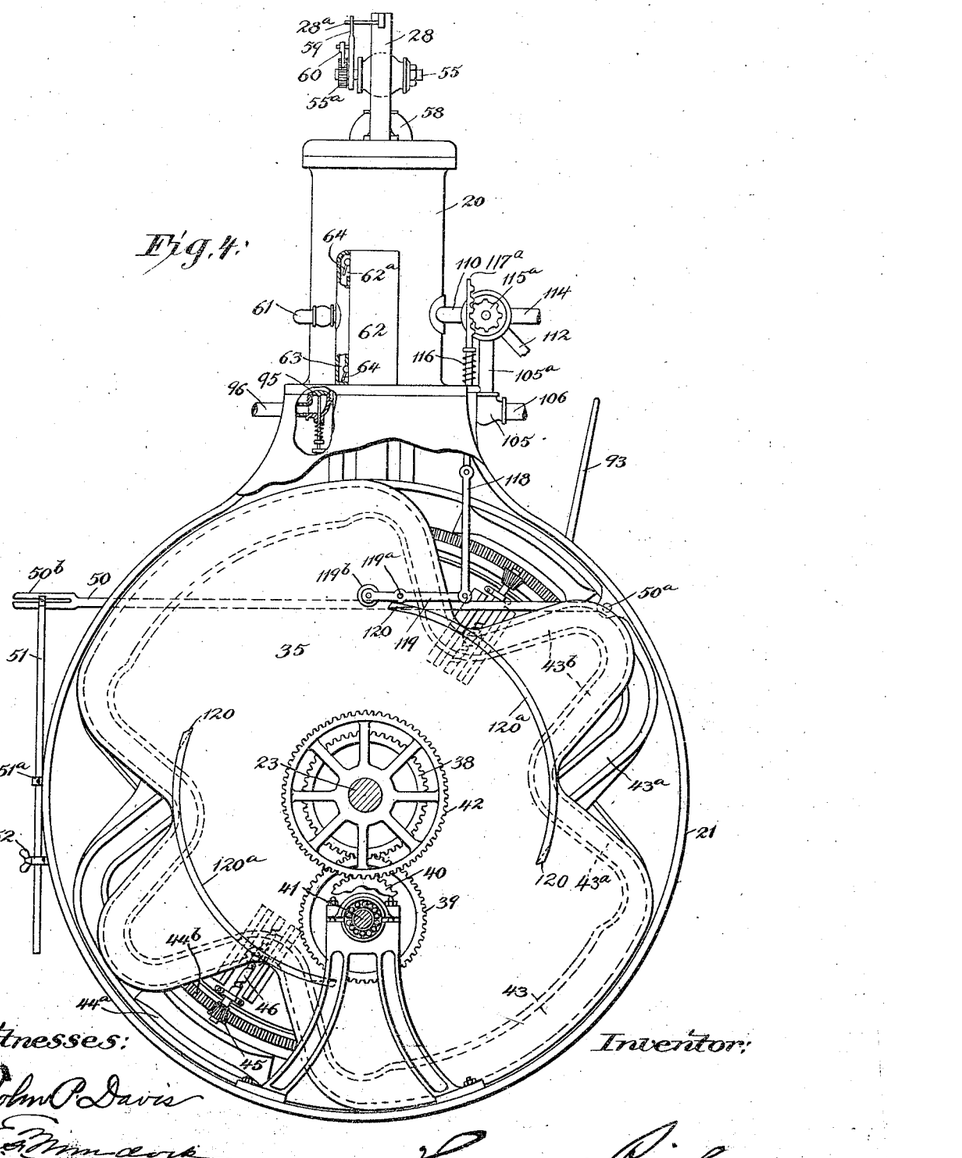
Fig. 4 is a rear elevation with parts broken away and parts in section.

Compressed air, to be mixed with the fuel, is supplied to the carbureter 58 through inlets 61 located at opposite sides of the spraying or vaporizing chamber 58$^a$ of the carbureter, which is divided into two chambers by a partition 58$^b$. The ends of the inlets 61 are preferably not radial, but tangential or approximately so, for the purpose of giving a whirling motion to the air entering the spraying chamber 58$^a$. Air is supplied to said inlets from two compressors 62, provided at each end with ports 62$^a$ having connections 63 leading to the corresponding inlet pipe 61 and controlled by check-valves 64 opening toward the carbureter (Fig. 4). Each compressor cylinder contains a chambered piston 65 having top and bottom openings controlled by double valves 66 arranged to be operated automatically when the piston reverses its motion. Each valve comprises two heads adapted to become seated on seats in the respective end faces of the piston 65, and a stem connecting said heads and of such a length that only one of the heads can be seated at a time. With the piston is connected a hollow piston rod 67, open to the chamber within the piston, and also open, as by a slot 67$^a$, to the inside of the casing, from which it draws the supply of air, it being understood that air has free access to the interior of the casing through the hollow piston rod 28. The piston rods 67 are secured to the yoke 29, as by screwing. During the upward stroke of the yoke, the upper valve heads are seated, air is drawn into the chamber below the piston 65 through the hollow piston rod 67, since the chamber within the piston is open to the chamber below the piston; at the same time air is expelled from the chamber above the piston and forced over to the carbureter. When the piston travels downward, the lower heads of the valves 66 become seated, causing the interior of the piston 65 to communicate with the chamber above the piston, into which chamber air is drawn through the hollow piston rod, while at the same time air is forced over to the carbureter from the chamber below the piston.

The vaporizing, spraying or mixing chamber 58$^a$ may contain baffle projections 58$^c$ to aid in thoroughly mixing the gasolene or other fuel with the air. Below the partition 58$^b$ is located the fuel chamber or liquid chamber 58$^d$, to which gasolene may be fed at the start through a priming connection 68. When the engine is running, the fuel is supplied through the gasolene pipe 69 in which is located a valve 70 seated by the pressure of the liquid and also by a spring 70$^a$ (see Fig. 8). The angular stem of the valve 70 is projected into the carbureter and carries a convex roller 71 mounted to turn about a vertical axis and arranged for engagement with the convex surface of the rim 72 which forms part of a fan wheel. The rim 72 has a spider 72$^a$ connecting it with a hub 72$^b$ fitted to slide and turn on a sleeve 58$^e$ projected upwardly from the bottom of the carbureter (see Fig. 9). To the upper face of the rim 72 are secured the lower pointed ends of fan blades which are inclined upward and inward, each blade having a central depression or ridge 73$^b$ toward which converge the two opposite inclined surfaces 73 and 73$^a$. The blades are fastened at their upper ends to a small ring 74, and may be connected at their lower portions by larger ring 75. The parts shown in Fig. 10 are rigidly connected and form the fan wheel. Two arms of the spider 72$^a$ are provided with openings 72$^c$ through which extend loosely vertical arms 76$^a$ secured to a crown 76$^b$ forming part of the feeder shaft 76, contained in the sleeve 58$^e$. By this construction the fan wheel is compelled to rotate with the feeder shaft, while free to move lengthwise thereof. It will be understood that when the fan wheel rotates, the gasolene struck by the inclined blades will cause the wheel to rise more or less on the shaft, according to the level of the liquid. The rim 72 will press on the roller 71 and open the valve 70 more or less. The rise of the fan wheel (which will take place whether it rotates in one direction or the other) will up to a certain point cause a more copious flow of gasolene, but an excessive rise will throttle the passage or even bring the rim 72 entirely above the roller 71, causing the valve 70 to close fully. A collar 77 serves to secure the shaft 76 against lengthwise movement. The crown 76$^b$ has a serrated edge (see Fig. 11) so as to drive the liquid away from the joint between said crown and the sleeve 58$^e$.

To the upper end of the shaft 76 is secured the downwardly tapering feeder 78 which is fitted into a corresponding socket 79 located at the center of the partition 58$^b$. The feeder has one or more spiral grooves 78$^a$ on its conical surface, the upper ends of such grooves communicating with the mixing or spraying chamber 58$^a$, while their lower end or ends will register at times with grooves 79$^a$ on the inner surface of the socket 79. When there are two grooves 78ª, they preferably extend in opposite directions as shown. There may be two or more grooves 79ª, their lower ends being permanently open to the fuel chamber 58ᵈ, and their upper ends being at a slightly higher level than the lower end of the feeder grooves 78ª. The liquid fuel will rise in the grooves 79ª; and as the feeder rotates, the small amount of liquid which enters the grooves 78ª from below is whirled upward and outward by centrifugal force and discharged into the spraying chamber 58ª where it becomes mixed with air. The faster the feeder rotates, the oftener will the grooves 78ª register with the grooves 79ª during the same period of time, and the greater the amount of gasolene or other fuel fed to the mixing or spraying chamber.

Figure 3:
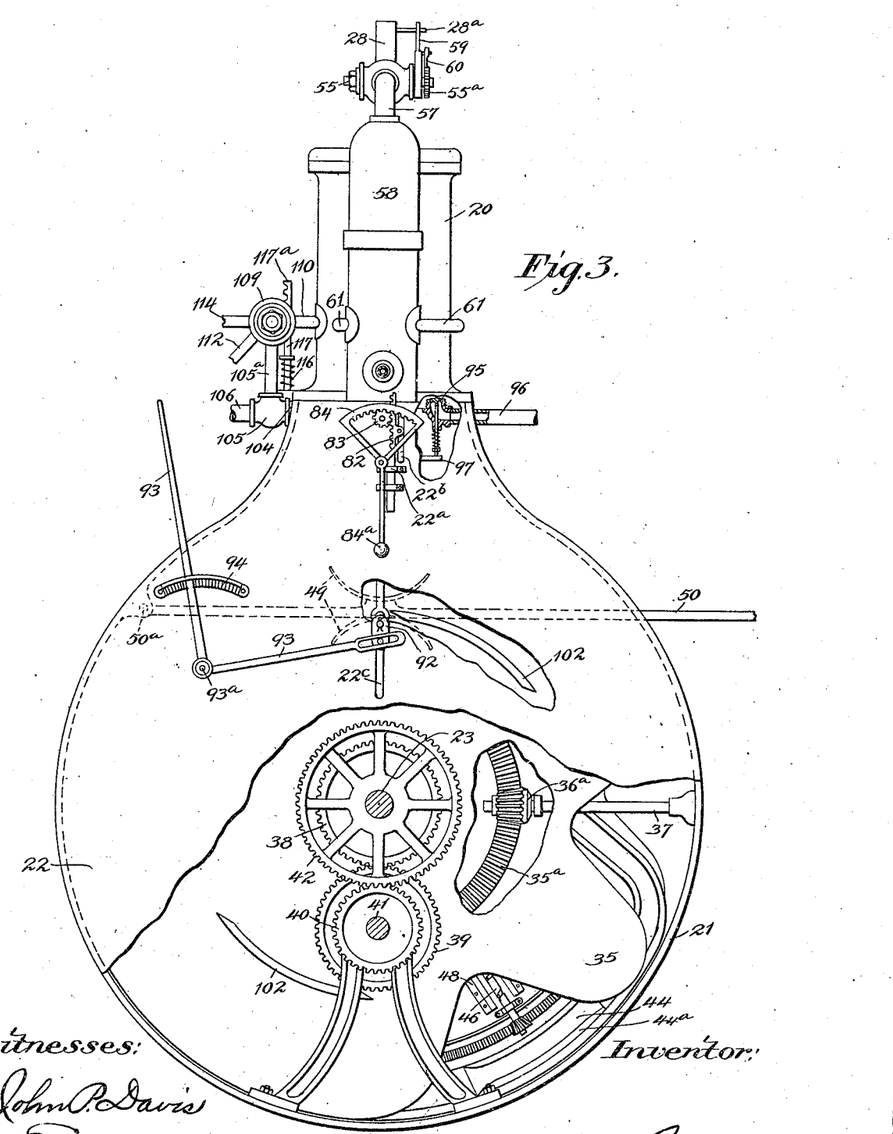
Fig. 3 is a front elevation with parts broken away and parts in section.
Figure 6:
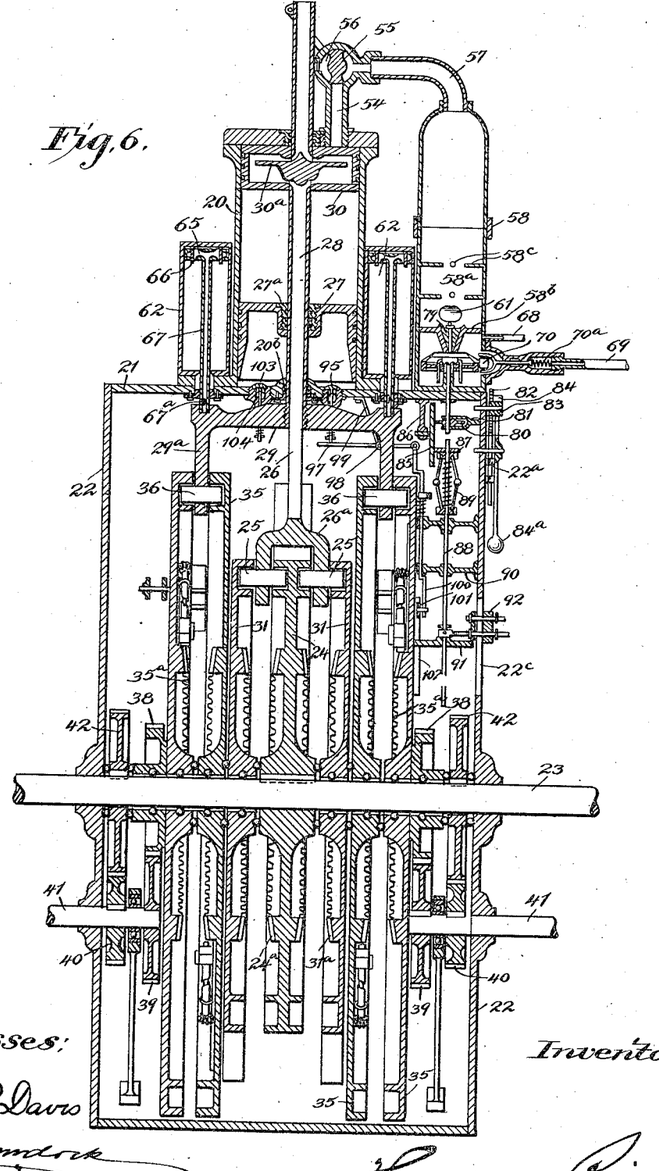
Fig. 6 is a central vertical section taken lengthwise of the shaft.

The mechanism for rotating the feeder 79 is shown best in Figs. 3 and 6. On the lower end of the feeder shaft 76 is mounted a friction disk 80 held to turn with the shaft but capable of sliding thereon together with a forked carrier 81 movable up and down on one of the heads 22 and rigidly connected with a rack 82. Guides 22ª are provided for the rack 82 and a guide slot 22ᵇ for the passage of the carrier 81. The rack is in mesh with a pinion 83, wide enough to also engage a toothed sector 84 which, like the pinion, is journaled in the end plate or head 22. A weight 84ª tends to keep the sector in the central position shown in Fig. 3, and the friction disk 80 at a corresponding normal level. If the engine is used, say on an automobile, and so disposed that the sector 84 will swing in a plane lengthwise of the carriage (that is, having the shaft 23 disposed transversely of the carriage), then as the automobile goes up hill or downhill, the pendulum sector 84 will automatically change the position of the friction disk 80 relatively to center the friction disk 85 by which it is driven. The speed of the feeder shaft 76 will thus be increased or diminished automatically as the carriage travels up hill and downhill. When the engine is stationary, the automatic governor just described is dispensed with, the friction disk 80 being secured rigidly to the shaft 76 in this case.

The friction disk 85, which is journaled in a stationary bracket 86, is driven by a friction disk 87 mounted to slide on a shaft 88 and controlled by a governor 89. The governor shaft 88 is journaled in stationary brackets 90 and carries a friction wheel 91 engaging one of the lateral disks 35 and driven thereby. If the engine speed increases, the governor disk 87 will move downward, thus reducing the speed of the friction disks 85, 80 and that of the feeder 78, and correcting the engine speed. In the reverse case, the governor disk will move upward, increasing the rotary speed of the feeder. An automatic speed regulation is thus obtained by varying the supply of fuel to the mixing chamber 58ª.

In some cases it may be desirable to alter the normal speed to which the engine will be held by the operation of the governor 89. For this purpose the friction wheel 91, while always rotating with the governor shaft 88, may be capable of sliding thereon, being connected with a slide 92 adjustable up and down adjacent to a slot 22ᶜ, by means of a lever 93 fulcrumed at 93ª and held in position after adjustment, by any suitable means, such as a pawl engaging a segmental rack 94.

In the bottom of the cylinder 20 is arranged an exhaust port controlled by a valve 95 and connected with the exhaust pipe 96 leading to the atmosphere or to a muffler (not shown). This valve is operated mechanically at the proper time by a lever 97 fulcrumed at 98 on a bracket 99 and loosely connected with a rod 100 sliding in stationary parts, such as the brackets 90. The inner end of this rod carries a roller 101 arranged to be engaged by the inner surfaces of two cams 102 on one of the disks 35, it being remembered that this disk rotates at twice the speed of the shaft 23, so that the exhaust valve 95 will be operated four times for each revolution of said shaft.

At the bottom of the cylinder 20 is further arranged an inlet port controlled by an automatic inwardly opening valve 103 and connected by a pipe 104 (Figs. 3, 5 and 6) with a chamber 105. This chamber has another connection 106, controlled by an inwardly-opening valve 107 and leading to a pressure tank 108 and to a storage tank 108ª. The chamber 105 has a third connection 105ª leading to a valve casing 109, which has three additional connections as follows: one, designated as 110, leading to a preliminary exhaust port 111 located in the side of the cylinder 20 at a level slightly above the top of the power piston 27 when the latter is at the end of its downward stroke; a second connection 112 leading to the tank 108 and provided with a check valve 113 opening toward said tank; and a third connection 114, leading to the air. A rotary plug 115 is mounted in the valve casing 109 and is normally kept in the position shown in Fig. 5, by means of a spring 116 acting on a vertically sliding rod 117 which is provided with a rack 117ᵇ in mesh with a pinion 115ª on the plug 115 (see Fig. 4). Thus, normally the preliminary exhaust port 111 is in communication, through the connection 110, valve casing 109, passage of the plug 115, connection 105ª and chamber 105, with the pipe 104 leading to the inlet valve 103 at the bottom of the cylinder 20.

At times specified hereinafter, the plug 115 is turned to connect the port 111 temporarily with the tank 108 and with the air connection 114. For this purpose, the lower end of the rod 117 is connected, by a link 118, with a lever 119 fulcrumed on the second end plate 22 at 119ª and provided with a roller 119ᵇ to engage two cams 120 on the adjacent end disk 35, so that the valve 115 will be operated four times during each revolution of the shaft 23, since said disk rotates twice as fast as the shaft.

I prefer to make one end of the cam 120 with a gradual incline, and the other with an abrupt shoulder, so that the valve 115 may open (comparatively) slowly, and close suddenly, for purposes hereinafter stated. When the engine is to be reversible, I employ two sets of cams 120, 120ª, located similarly, and differing only by the fact that the gradual incline is at that end of a cam 120 where the corresponding cam 120ª has an abrupt shoulder, and vice versa. The cams 120 are in one plane, and the cams 120ª in a different plane. In order that in this case the roller 119ᵇ may be made to register automatically with the proper set of cams, according to the direction of rotation, I provide the following construction: The roller is provided, at its central opening, with a pin 119ᶜ projecting into a groove of the stud 119ᵈ on which said roller is journaled, the stud being rigid with the lever 119 (see Fig. 14). The said groove comprises a helical portion 119ᵉ connected at each end with a transverse annular portion 119ᶠ. Springs 121 secured at the ends of the stud tend to shift the roller 119ᵇ lengthwise of the stud, giving the roller pin 119ᶜ a tendency to enter the helical groove 119ᵉ. These springs engage the roller loosely.

The operation of the pistons in the cylinder 20 is as follows, it being understood that the movements of these pistons are governed by the guides of the rotary members or disks 24, 31 and 35. Let us assume the power piston 27 has just completed its downward working stroke, the auxiliary piston 30 at that time being at the top of the cylinder. The preliminary exhaust port 111 being uncovered, and the valve 115 standing in the position shown in Fig. 5, the exhaust passes through the pipes 110, 105ª and 104 to the chamber below the power piston 27, the valve 103 opening automatically, while the valve 107 is kept closed by the pressure. Then, while the power piston remains stationary, the auxiliary piston performs three strokes as follows. First, a downward stroke, at the beginning of which the valve 115 is turned, by the action of one of the cams 120 or 120ª, to place the preliminary exhaust port 111 in communication for a short time with the tank 108, which thus receives a portion of the combustion products, and immediately thereafter the port 111 communicates with the air through the port or connection 114, with which it remains in communication during the next three strokes of the auxiliary piston. The valves 53 close automatically during the downward stroke of the auxiliary piston, and during the first downward stroke the rotary valve 55 stands in such a position that the upper end of the cylinder, above the auxiliary piston, communicates with the outer air, so that said end becomes filled with air as the piston descends. Second, the auxiliary piston moves upward, causing the valves 53 to open and air to pass from above the piston to below it. Third, the auxiliary piston moves down again, the valve 55, now standing in such a position that the upper end of the cylinder communicates with the carbureter, so that a charge of the combustible mixture (already compressed to a certain extent by the action of the air compressors), is admitted to the upper end of the cylinder, the volume at atmospheric pressure being greater than the cubic contents of the cylinder. At the same time, the air contained in the chamber between the two pistons 27 and 30, is expelled through the outlet 114, together with any remnant of burnt gases, thus scavenging the working chamber, and also cooling it and the pistons. The cooling is also assisted by the passage of air through the auxiliary piston and its piston rod, as said piston reciprocates.

Just before the auxiliary piston reaches the end of its second downward stroke, the valve 115 still connecting the port 111 with the outside air, the main piston starts on its upward stroke, the pistons meeting at about the level of the port 111 so as to entirely expel the air. Then both pistons move upward, the auxiliary piston, however, moving faster so that it reaches its upper position, at the top of the cylinder, before the power piston has completed its stroke. As soon as the power piston rises, it closes the port 111. The upward movement of the power piston is assisted by the pressure of the gases which have been previously admitted to the lower end of the cylinder, and also by the flow of gases from the tank 108, the valve 107 opening toward the pipe 104 and closing the lower end of the connection 105ª. At the same time, the valves 53 close and the combustible charge is compressed between the two pistons 27 and 30. As the power piston approaches its upper position, its lower end uncovers the port 111 and some of the gases escape from below the piston to the air through the outlet 114. Then the valve 115 resumes its normal position shown in Fig. 5 (the roller 119ᵇ coming off the cam 120 or 120ª) and the auxiliary piston is given the short ignition stroke hereinbefore referred to, whereby the charge is subjected to a sudden increase of pressure, sufficient to ignite it throughout the working chamber, and not only locally, as is the case with electric ignition. The power piston then has its downward working stroke, the auxiliary piston remaining at the top of the cylinder. At a suitable moment during this stroke, the exhaust valve 95 is opened through the action of one of the cams 102, and the resistance to the downward movement of the piston is removed. This exhaust valve closes at the proper time co-inciding more or less with the end of the piston's power stroke. Each downward stroke of the piston is a combustion stroke or power stroke, and some power is also exerted during each upward stroke.

The compressed gases stored in the tank 108ᵃ may be used to start the engine, by admitting them through a pipe controlled by a manually operated cock or valve, either below or above the power piston.

The sudden and complete detonation of the charge which results from the particular method of ignition employed by me, insures a material increase in power. With my invention, there is no danger of afterburning, the exhaust is cooler, a greater compression is available, and the power is also increased by reason of the greater volume of the explosive mixture forced into the cylinder.

I claim:

1. In an internal combustion engine, a cylinder, a piston dividing it into two chambers, an outlet port from the combustion chamber and an inlet port to the other chamber, a connection between said ports, a pressure receptacle connected with said outlet port, a valve for connecting said outlet port with the pressure receptacle, the inlet port, or the outer air, and means controlled by the engine, for operating said valve.

2. In an internal combustion engine, a base, a cylinder thereon, a stuffing box at each end thereof, a power piston in said cylinder provided with a passage and a stuffing box, means comprising a valved auxiliary piston also in said cylinder and mechanism for reciprocating the same for the purpose of inhaling and expelling a charge of air, inhaling and exploding a charge of explosive vapor and expelling the burnt gases, a hollow rod fixed in the auxiliary piston in communication with the interior thereof and extending outwardly through the cylinder-head and inwardly through the passage in the power piston into the base, and means comprising air pumps actuated by the auxiliary piston adapted to draw air through the hollow rod into the base and lead it tangentially into a fuel supply chamber and thence into an explosive vapor reservoir.

3. In an internal combustion engine, a cylinder, a power piston and an auxiliary piston therein, a rotary member driven by the power piston, another rotary member operatively connected with the auxiliary piston to reciprocate the same, and a speed-increasing connection between the two rotary members.

4. In an internal combustion engine, a cylinder, a power piston and an auxiliary piston therein, two operatively connected rotary members each provided with an undulating guide, and operative connections from each piston, engaging the respective rotary members at the guides thereof, the rotary member which works in conjunction with the auxiliary piston, rotating at a rate of speed which is a multiple of that of the other rotary member.

5. In an internal combustion engine, a cylinder, a power piston and an auxiliary piston therein, two operatively connected rotary members each provided with an undulating guide, and operative connections from each piston, engaging the respective rotary members at the guides thereof, the undulations of the said members being so arranged that immediately after the working stroke of the power piston the latter will remain stationary, while the auxiliary piston reciprocates, whereupon both pistons will move together and then the power piston has its power stroke while the auxiliary piston is stationary.

6. In an internal combustion engine, a cylinder, a power piston and an auxiliary piston therein, two operatively connected rotary members each provided with an undulating guide, and operative connections from each piston, engaging the respective rotary members at the guides thereof, the member which works in conjunction with the auxiliary piston, being provided with a circumferential guideway, an ignition controller adjustable along said guideway, and means for adjusting said controller.

7. In an internal combustion engine, a cylinder, a power piston and an auxiliary piston therein, two operatively connected rotary members each provided with an undulating guide, and operative connections from each piston, engaging the respective rotary members at the guides thereof, the member which works in conjunction with the auxiliary piston, being provided with a circumferential guideway, an ignition-controlling slide movable along said guideway, and adapted to give the auxiliary piston a sudden movement toward the power piston, means carried by the rotary member, for shifting said slide, and a normally stationary actuating member adjustably supported on a stationary part of the engine and adapted to operate said shifting means.

8. In an internal combustion engine, a cylinder, a power piston and an auxiliary piston therein, two operatively connected rotary members each provided with an undulating guide, and operative connections from each piston, engaging the respective rotary members at the guides thereof, the member which works in conjunction with the auxiliary piston, being provided with a circumferential guideway, an ignition-controlling slide movable along said guideway and provided with a segmental rack, a radial shaft journaled on said rotary member and carrying a pinion in mesh with said rack, and also provided with a helical groove, another slide movable lengthwise of said shaft and having a projection extending into the groove thereof, and a normally stationary adjustable actuating member for shifting the second-named slide.

9. In an internal combustion engine, a cylinder, a power piston and an auxiliary piston therein, two operatively connected rotary members each provided with an undulating guide, and operative connections from each piston, engaging the respective rotary members at the guides thereof, the member which works in conjunction with the auxiliary piston, being provided with a circumferential guideway, an ignition-controlling slide movable along said guideway and provided with a segmental rack, a radial shaft journaled on said rotary member and carrying a pinion in mesh with said rack, and also provided with a helical groove, another slide movable lengthwise of said shaft and having a projection extending into the groove thereof, and another projection extending in the opposite direction, and an actuating lever fulcrumed on a stationary part of the engine, and provided with oppositely curved arms adapted to engage the second-named projection and shift the said slides.

10. In an internal combustion engine, a cylinder having an inlet port at one end, an exhaust port at its central portion, a passage connecting said ports, a valve controlling said passage and also controlling a connection of said exhaust port with a storage tank and the air, and mechanism for causing said valve to pass relatively slowly from its normal position in which it connects the two ports, to positions in which the exhaust port is connected successively with the storage tank and with the air, and means for causing the valve to then move quickly to its normal position.

11. In an internal combustion engine, a cylinder having an inlet port at one end, an exhaust port at its central portion, a passage connecting said ports, a valve controlling said passage and also controlling a connection of said exhaust port with a storage tank and the air, and mechanism for causing said valve to pass relatively slowly from its normal position in which it connects the two ports, to positions in which the exhaust port is connected successively with the storage tank and with the air, means for causing the valve to then move quickly to its normal position, and reversing mechanism for causing said valve to be operated differently according to the direction in which the engine rotates.

12. In an internal combustion engine, a cylinder having an inlet port at one end, an exhaust port at its central portion, a passage connecting said ports, a valve controlling said passage and also controlling a connection of said exhaust port with a storage tank and the air, an operating member connected with said valve and having a spiral groove with annular grooves at each end, a roller having a projection working in said grooves, and cams, rotated by the operation of the engine and located in different planes, and adapted for engagement with said roller, the rotation of the cams in one direction or the other operating to shift the roller on said operating member.

13. In an internal combustion engine, a cylinder, a piston having a piston rod extending through the cylinder head, a carbureter, a pipe connecting the carbureter with the cylinder, a valve in said pipe, and pawl-and-ratchet mechanism for operating said valve, actuated by the projecting portion of the piston rod.

14. In an internal combustion engine, a cylinder, a main piston and an auxiliary piston, the auxiliary piston having a piston rod extending through the cylinder head, a carbureter, a pipe connecting the carbureter with the cylinder and also having a connection to the air, a valve located in said pipe and adapted to connect the cylinder successively with the carbureter and with the air, and means, operated by the projecting portion of said piston rod, for actuating said valve intermittently.

15. In an internal combustion engine, a cylinder, a main piston and an auxiliary piston, a carbureter, a pipe connecting the carbureter with the cylinder and also having a connection with the air, a valve periodically operated by the engine and located in said pipe, and a check valve located between said valve and the air connection.

16. In an internal combustion engine, a base, a cylinder mounted thereon, a power piston, a shaft, a plurality of intergeared cam-like rotary members embracing said shaft and rotating in opposite directions operatively engaged by projections attached to the power piston rod, a hollow auxiliary piston disposed in the same cylinder and adapted to inhale and explode a charge of explosive vapor and eject the burnt gases thereof, and to inhale and eject a charge of air, a hollow piston rod attached thereto and extending through the cylinder head, through the power piston and through the cylinder base, said auxiliary piston rod being in operative engagement with a plurality of intergeared cam-like rotary members embracing said shaft and rotating in opposite directions and so arranged as to rotate at a greater velocity than the first named rotary members.

17. In an internal combustion engine, a base, a cylinder, a power piston and an auxiliary piston within the cylinder and each in operative engagement with a plurality of cam-like rotary members, said auxiliary piston being adapted to inhale and explode the power charge and eject the burnt gases thereof, and to inhale and eject a charge of air and having a hollow piston rod through which air may enter the base, and being further connected with valved pistons operating in cylinders mounted upon and communicating with the interior of said base and adapted to exhaust and compress the air therefrom.

18. In an internal combustion engine, a base, a shaft, a cylinder, a power piston and an auxiliary piston within the cylinder and operatively engaged with a plurality of cam-like rotary members mounted on said shaft, the auxiliary piston being adapted to inhale and explode the power charge and eject the burnt gases thereof, and to inhale and eject a charge of air, air exhausting and compressing cylinders having pistons operated by the auxiliary piston, tubular connections leading from said air cylinders to an air receptacle, and means comprising a fuel supply, a valve and operative mechanism, for injecting fuel into said air receptacle to form a combustible mixture, a tubular connection leading from the mixture receptacle to the main cylinder, said connection having an inlet valve communicating with the atmosphere, and a valve operated by the engine for alternately leading a supply of combustible mixture and a supply of air to the engine cylinder.

19. In an internal combustion engine, a cylinder having an inlet port at one end for combustible mixture, an exhaust port at its central portion, a passage leading from said exhaust port to the other end of the cylinder and closed by a check valve, a valve and means comprising a spring and mechanism operated by the engine for operating said valve, to control said passage and also to control a connection of said exhaust port with a storage tank and the atmosphere, a connection leading from said storage tank to the cylinder and controlled by a valve, and a final exhaust port leading from the cylinder to the atmosphere and controlled by a valve operated by a moving part of the engine.

20. In an internal combustion engine having a base, a cylinder, a power piston and an auxiliary piston within the cylinder and in operative engagement with a plurality of cam-like rotary members, the auxiliary piston being adapted to inhale and explode the power charge and eject the burnt gases thereof, and to inhale and eject a charge of air, means comprising a hollow piston rod, cylinders and pistons operated by the auxiliary piston, for leading into and exhausting air from said base, and means for mixing said air with fuel and compressing the gaseous mixture in a mixture receptacle.

21. In an internal combustion engine, a base, a cylinder, a power piston and an auxiliary piston within the cylinder and in operative engagement with a plurality of cam-like rotary members, the auxiliary piston being adapted to inhale and explode the power charge and eject the burnt gases thereof, and to inhale and eject a charge of air, an inlet port for explosive mixture at one end of the cylinder, an exhaust port in the central portion thereof, a valved inlet port and a valved outlet port for non-explosive mixture at the other end thereof, and means actuated by the engine for operating the valve of the last-mentioned port.

22. In an internal combustion engine, a base, a cylinder, a power piston and an auxiliary piston within the cylinder and in operative engagement with a plurality of cam like rotary members the auxiliary piston being adapted to inhale and explode a power charge and eject the burnt gases thereof, and to inhale and eject a charge of air, means comprising auxiliary air compressors operated by the auxiliary piston, a fuel supply, and a storage tank for injecting into the cylinder a combustible mixture, the volume of which at atmospheric pressure is greater than the cubic contents of the cylinder.

23. In an internal combustion engine, a base, a cylinder, a power piston and an auxiliary piston reciprocating in said cylinder and each operatively connected with a cam-like rotary member, the auxiliary piston being adapted to inhale and explode a power charge and eject the burnt gases thereof, and to inhale and eject a charge of air, means for preventing lateral strain and friction of the pistons and their connections, said means comprising additional rotary members also engaged by said pistons and intergeared with the first-named rotary members to rotate in an opposite direction therewith.

24. In an internal combustion engine, the combination with a base, a cylinder, a power piston therein having a compression stroke and a power stroke followed by a period of rest, of an auxiliary piston also in said cylinder, having a combined exhaust and air-suction stroke, following the power stroke of the main piston, a return stroke, a combined air expulsion and gas suction stroke, a return stroke operating during the compression stroke of the main piston, and a short ignition stroke followed by a period of rest, during which the main piston has its power stroke, means for operating the pistons, a fuel supply, a valve operated by the engine for admitting an alternate charge of explosive vapor and of air, and an adjustable igniting device for exploding the explosive vapor.

In testimony whereof I have hereunto signed my name in the presence of two subscribing witnesses.

HERMANN REICHE.

Witnesses:
　JOHN LOTKA,
　JOHN A. KEHLENBECK.